(12) United States Patent
Motonakano et al.

(10) Patent No.: US 6,535,255 B2
(45) Date of Patent: Mar. 18, 2003

(54) ILLUMINATION INTENSITY CORRECTING CIRCUIT

(75) Inventors: Hitoshi Motonakano, Kagoshima (JP); Shozo Mitarai, Kagoshima (JP); Akira Arimizu, Kagoshima (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/960,986

(22) Filed: Sep. 25, 2001

(65) Prior Publication Data

US 2002/0005911 A1 Jan. 17, 2002

Related U.S. Application Data

(63) Continuation of application No. 09/348,075, filed on Jul. 6, 1999, now Pat. No. 6,295,098.

(30) Foreign Application Priority Data

Jul. 6, 1998 (JP) ............................................ 10-190446

(51) Int. Cl.[7] .......................... H04N 9/69; H04N 5/202; H04N 5/18
(52) U.S. Cl. ...................... 348/675; 348/676; 348/674; 348/677; 348/689; 348/687; 348/254
(58) Field of Search ................................. 348/674, 675, 348/676, 677, 254, 255, 256, 258, 707, 692, 687, 689

(56) References Cited

U.S. PATENT DOCUMENTS

| | | | | |
|---|---|---|---|---|
| 5,258,658 A | * | 11/1993 | Morikawa | 307/264 |
| 5,461,430 A | * | 10/1995 | Hagerman | 348/674 |
| 5,483,256 A | * | 1/1996 | Ohi | 345/98 |
| 5,526,058 A | * | 6/1996 | Sano et al. | 348/674 |
| 5,610,666 A | * | 3/1997 | Ueda et al. | 348/676 |
| 5,864,370 A | * | 1/1999 | Knox et al. | 348/674 |
| 5,900,918 A | * | 5/1999 | White | 348/674 |
| 5,933,199 A | * | 8/1999 | Yoon | 348/674 |
| 5,990,979 A | * | 11/1999 | Koyama et al. | 348/674 |

* cited by examiner

Primary Examiner—John Miller
Assistant Examiner—Paulos Natnael
(74) Attorney, Agent, or Firm—Rader, Fishman & Grauer PLLC; Ronald P. Kananen, Esq.

(57) ABSTRACT

An illumination intensity correcting circuit including a curve fitting circuit formed by differential amplifier circuits and a load resistor, wherein the amplification factor of the curve fitting circuit is changed before and after each breakpoint voltage, the reference voltages of the differential amplifier circuits are set so that at least two breakpoint voltages are arranged in the range of a voltage of a video signal, and the amplification factors of the differential amplifier circuits are set so that the amplification factor of the curve fitting circuit in the range of the signal voltage inside of the two breakpoint voltages is smaller than the amplification factor outside of the two breakpoint voltages.

19 Claims, 7 Drawing Sheets

ILLUMINATION INTENSITY CORRECTING CIRCUIT

This application is a continuation of application Ser. No. 09/348,075, filed Jul. 6, 1999 now U.S. Pat. No. 6,295,098.

BACKGROUND OF THE INVENTION

1. Field of the Invention

The present invention relates to an illumination intensity correcting circuit for correcting the intensity of a video signal or three primary color signals.

2. Description of the Related Art

FIG. 1 is a schematic block diagram of a computer display apparatus of the related art. This computer display apparatus 100 includes a signal amplifier circuit 20, a cathode ray tube (hereinafter referred to as a CRT) 30, and a deflection circuit 40. The signal amplifier circuit 20 includes first to third amplifier circuits 21 to 23. The CRT 30 includes an electron gun 34. The first amplifier circuit 21 receives as an input a red primary color signal SR to amplify the same and supplies the resultant signal SR2 to a cathode 31 of the electron gun 34. The second amplifier circuit 22 receives as an input a green primary color signal SG to amplify the same and supplies the resultant signal SG2 to a cathode 32 of the electron gun 34. The third amplifier circuit 23 receives as an input a blue primary color signal SB to amplify the same and supplies the resultant signal SB2 to a cathode 33 of the electron gun 34.

The electron gun 34 generates electron beams BR, BG, and BB according to the output signals SR2, SG2, and SB2 correspondingly and emits the electron beams BR, BG, and BB to a fluorescent screen 35. This fluorescent screen 35 is made of a fluorescent material that is coated on the inside of the front glass of the CRT 30. The deflection circuit 40 receives as inputs horizontal and vertical synchronizing signals SH and SV and generates a magnetic force by a deflecting coil (yoke) in accordance with the signals SH and SV to change magnetic field force in the CRT 30 so that horizontal and vertical scanning by the electron beams from the electron gun 34 are carried out in the CRT 30. The three primary color signals SR, SG, and SB are analog output signals for example from digital-to-analog converters which are supplied with digital signals respectively from frame buffers used for the three primary color signals or from color look-up tables (CLUTs).

Known in the art is a "curve fitting circuit" for compressing the amplitude of an input signal by approximating the signal characteristic by a series of breakpoints connected by straight lines. For example, the curve fitting circuit is formed by a parallel-connected circuit which consists of a reference resistor (first resistor) and a serial-connected circuit that includes a diode, a second resistor, and a constant-voltage source. This constant-voltage source generates a reference voltage. If the terminal voltage of the reference resistor is smaller than the reference voltage, the diode is supplied with a reverse voltage and turned OFF, whereby the parallel-connected circuit is given a first electric resistance the same as that of the reference resistor. If the terminal voltage of the reference resistor is larger than the reference voltage, the diode is supplied with a forward voltage and turned ON, whereby the parallel-connected circuit is given a second electric resistance of the reference resistor and the second resistor connected in parallel. If the parallel-connected circuit is used as a load resistor, the electric resistance of the load resistor is changed before and after the reference voltage, so the parallel-connected circuit can form a curve fitting circuit.

However this curve fitting circuit is structured so that the diode is supplied with a reverse voltage and forms a depletion layer capacitance when the reverse voltage is supplied. Since the resistance of the parallel-connected circuit differs for a low frequency component and a high frequency component of the same input signal due to the capacitance of the depletion layer, this curve fitting circuit is not well suited for high speed operation.

Moreover the diode resistance changes according to the applied voltage of the reference resistor due to the non-linear characteristic of the diode, so this curve fitting circuit may suffer from distortion near each breakpoint in the signal characteristic.

A television receiver is sometimes provided with an illumination intensity correcting circuit for adjusting the relationship between the three primary color signals or video signal and the brightness of the image. For example, use is sometimes made of a gamma correcting circuit. As the curve of the gamma characteristic, use may be made of a convex secondary degree curve. Because the gamma correcting circuit of the related art forms a secondary degree curve by using capacitor elements, it is difficult to perform gamma-correction on the high frequency component of a video signal or three primary color signals.

SUMMARY OF THE INVENTION

An object of the present invention is to provide an illumination intensity correcting circuit which can perform gamma-correction on the high frequency component of a video signal or three primary color signals.

Another object of the present invention is to provide an illumination intensity correcting circuit which can prevent distortion near the breakpoints in the signal characteristic.

To achieve the above objects, according to a first aspect of the present invention, there is provided an illumination intensity correcting circuit for performing gamma-correction on a video signal comprising parallel-connected differential amplifier circuits for generating signals corresponding to the difference between a voltage of the video signal and the reference voltages of the differential amplifier circuits and a load resistor with one terminal connected to an input terminal of a source voltage and with another terminal connected to the output terminals of the differential amplifier circuits, wherein a curve fitting circuit whose amplification factor is changed before and after each breakpoint voltage is formed by the differential amplifier circuits and the load resistor, the reference voltages of the differential amplifier circuits are set so that at least two breakpoint voltages are arranged in the range of the voltage of the video signal, and the amplification factors of the differential amplifier circuits are set so that the amplification factor of the curve fitting circuit in the range of the signal voltage between the two breakpoint voltages is smaller than the amplification factor of the curve fitting circuit outside the range between the two breakpoint voltages.

To achieve the above objects, according to a second aspect of the present invention, there is provided an illumination intensity correcting circuit for performing gamma-correction on a video signal comprising differential amplifier circuits for generating signals corresponding to the difference between a voltage of the video signal and the reference voltages of the differential amplifier circuits; a synthesizing circuit including a differential amplifier circuit to synthesize output signals of the differential amplifier circuits; and a load resistor with one terminal connected to an input terminal of a source voltage and with another terminal connected to an output terminal of the synthesizing circuit, wherein a curve fitting circuit whose amplification factor is changed before and after each breakpoint voltage is formed by the differential amplifier circuits, the synthesizing circuit, and the load resistor, the reference voltages of the differential amplifier circuits are set so that a breakpoint voltage is arranged in the range of the voltage of the video signal, and the amplification factors of the differential amplifier circuits are set so that an amplification factor of the curve fitting circuit in a range of the signal voltage lower than the breakpoint voltage is larger than the amplification factor of the curve fitting circuit in the range higher than the breakpoint voltage.

To achieve the above objects, according to a third aspect of the present invention, there is provided an illumination intensity correcting circuit for performing gamma-correction on three primary color signals comprising first, second, and third correcting circuits respectively receiving as inputs red, green, and blue primary color signals and comprising parallel-connected differential amplifier circuits for respectively generating signals corresponding to the difference between voltages of the three primary color signals and the reference voltages of the differential amplifier circuits and a load resistor with one terminal connected to an input terminal of a source voltage and with another terminal connected to the output terminals of the differential amplifier circuits, wherein a curve fitting circuit whose amplification factor is changed before and after each breakpoint voltage is formed by the differential amplifier circuits and the load resistor, the reference voltages of the differential amplifier circuits are set so that at least two breakpoint voltages are arranged in the range of the voltages of the three primary color signals, and the amplification factors of the differential amplifier circuits are set so that the amplification factor of the curve fitting circuit in the range of the signal voltage between the two breakpoint voltages is smaller than the amplification factor of the curve fitting circuit outside of the range of the two breakpoint voltages.

To achieve the above objects, according to a fourth aspect of the present invention, there is provided an illumination intensity correcting circuit for performing gamma-correction on three primary color signals comprising first, second, and third correcting circuits respectively receiving as inputs red, green, and blue primary color signals and comprising differential amplifier circuits for respectively generating signals corresponding to the difference between voltages of the three primary color signals and the reference voltages of the differential amplifier circuits, a synthesizing circuit including a differential amplifier circuit to synthesize output signals of the differential amplifier circuits, and a load resistor with one terminal connected to an input terminal of a source voltage and with another terminal connected to an output terminal of the synthesizing circuit, wherein a curve fitting circuit whose amplification factor is changed before and after each breakpoint voltage is formed by the differential amplifier circuits, the synthesizing circuit, and the load resistor, the reference voltages of the differential amplifier circuits are set so that a breakpoint voltage is arranged in the range of the voltages of the three primary color signals, and the amplification factors of the differential amplifier circuits are set so that an amplification factor of the curve fitting circuit in a range of the signal voltage lower than the breakpoint voltage is larger than the amplification factor of the curve fitting circuit in a range higher than the breakpoint voltage.

Explaining the invention from another perspective, the first and third aspects of the present invention form curve fitting circuits which include parallel-connected differential amplifier circuits and a load resistor with one terminal connected to an input terminal of a source voltage and with another terminal connected to the output terminals of the differential amplifier circuits. The differential amplifier circuits generate signals corresponding to the difference between the voltage of the input signal and the reference voltages of the differential amplifier circuits. The differential amplifier circuits are parallel-connected, and the output signals of the differential amplifier circuits are synthesized so that a curve-fitting input-output characteristic is formed. The first aspect of the present invention provides an illumination intensity correcting circuit for gamma-correction of a video signal. The third aspect of the present invention provides an illumination intensity correcting circuit for gamma-correction of three primary color signals.

The second and fourth present inventions form curve fitting circuits each of which includes differential amplifier circuits, a synthesizing circuit that synthesizes output signals of the differential amplifier circuits, and a load resistor with one terminal connected to an input terminal of a source voltage and with another terminal connected to an output terminal of the synthesizing circuit. The differential amplifier circuits generate signals corresponding to the difference between the voltage of the input signal and the reference voltages of the differential amplifier circuits. The output signals of the differential amplifier circuits are synthesized by the synthesizing circuit so that a curve-fitting input-output characteristic is formed. The first aspect of the present invention provides an illumination intensity correcting circuit for gamma-correction of a video signal. The third aspect of the present invention provides an illumination intensity correcting circuit for gamma-correction of three primary color signals.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, an explanation will be made of preferred embodiments of the present invention with reference to the drawings.

Figure 1:
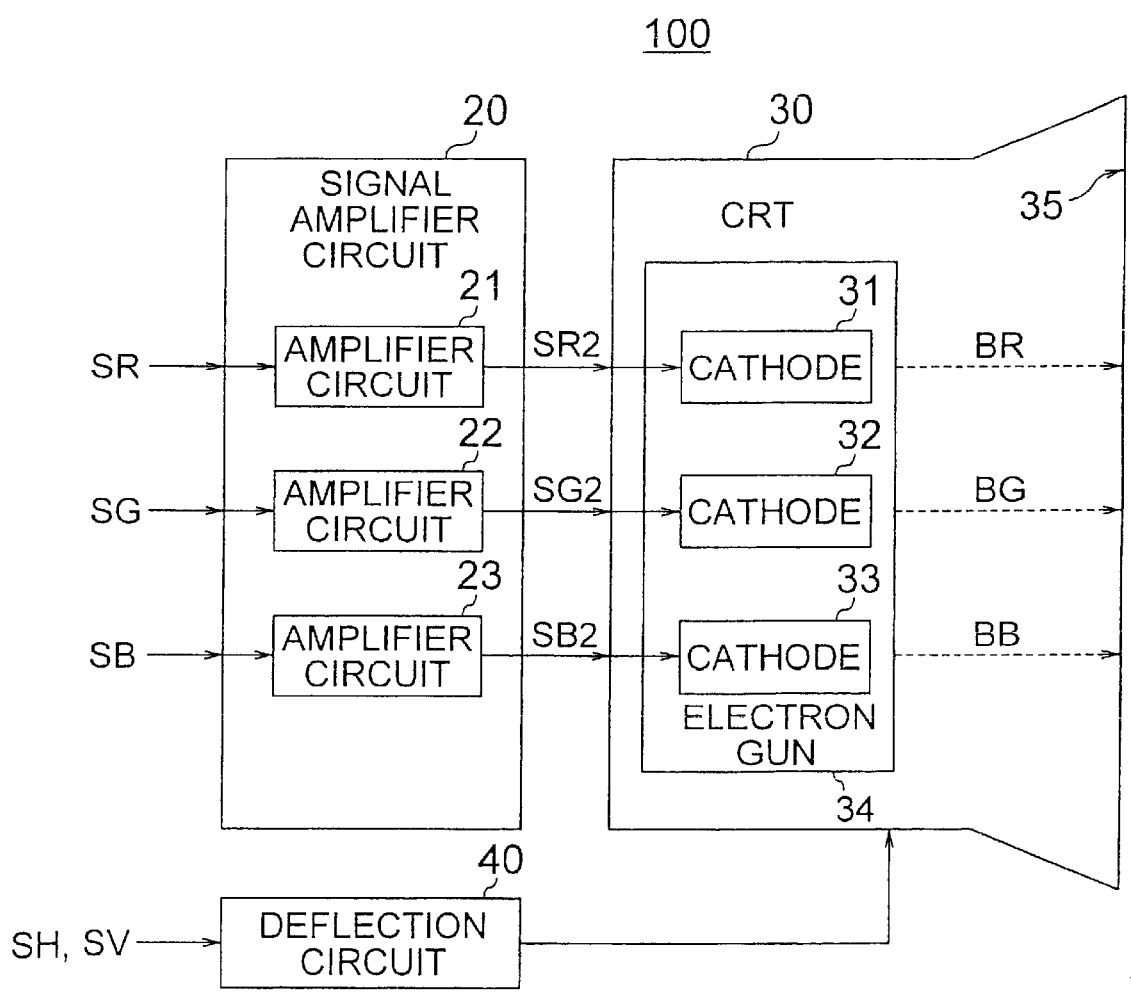
FIG. 1 is a schematic block diagram of a computer display apparatus of the related art.
Figure 2:
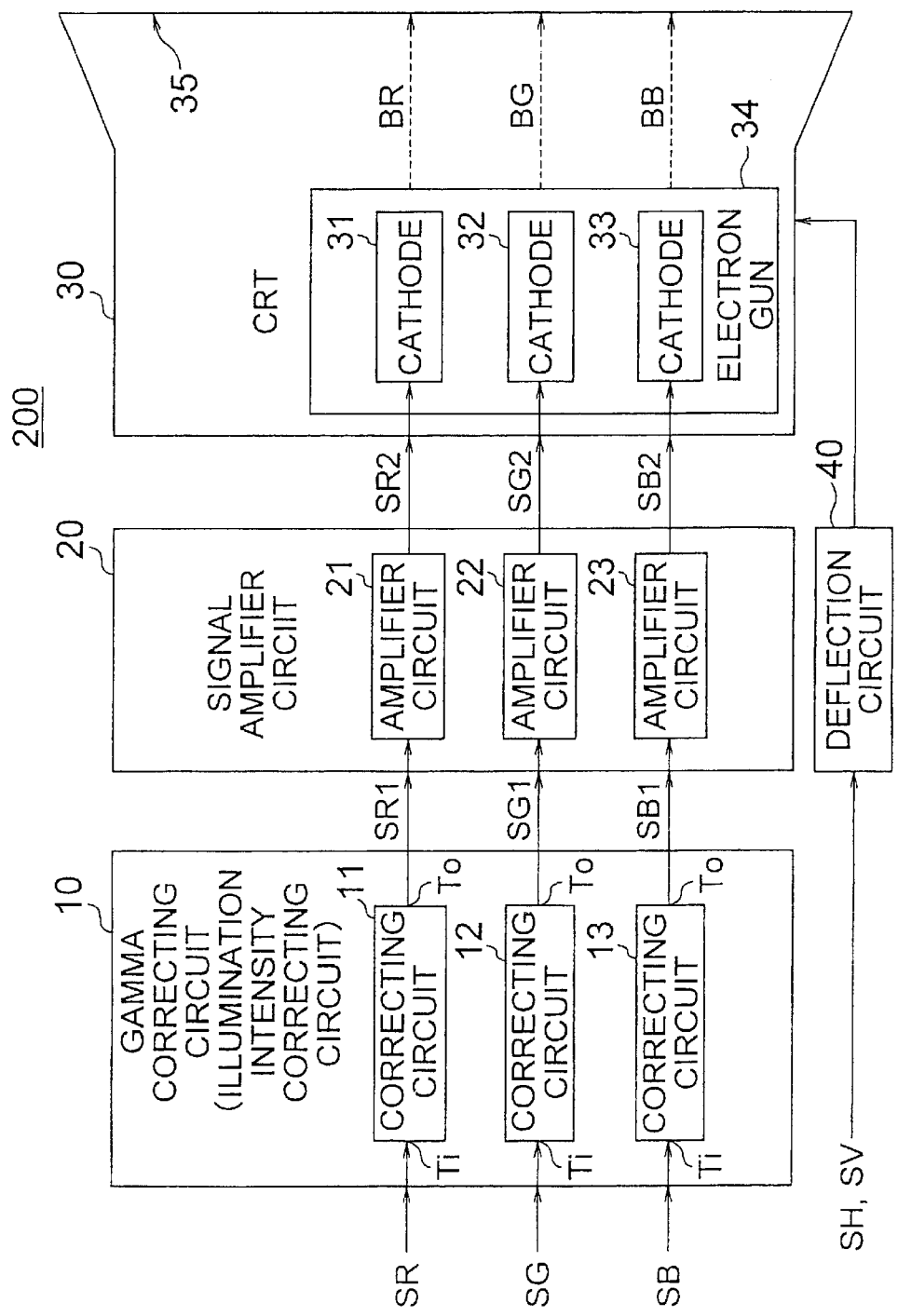
FIG. 2 is a schematic block diagram of a computer display apparatus that includes a gamma correcting circuit as an illumination intensity correcting circuit of the present invention.

FIG. 2 is a schematic block diagram of a computer display apparatus that includes a gamma correcting circuit as an illumination intensity correcting circuit of the present invention. This computer display apparatus 200 includes a gamma correcting circuit 10, a signal amplifier circuit 20, a CRT 30, and a deflection circuit 40. The gamma correcting circuit 10 includes first to third correcting circuits 11 to 13. The signal amplifier circuit 20 includes first to third amplifier circuits 21 to 23. The CRT 30 includes an electron gun 34 that has cathodes 31, 32, and 33 for three primary color signals.

The gamma correcting circuit 10 receives as inputs red, green, and blue primary color signals SR, SG, and SB and generates signals SR1, SG1, and SB1. The first correcting circuit 11 receives as an input the red primary color signal SR via an input terminal Ti of the same. The second correcting circuit 12 receives as an input the green primary color signal SG via an input terminal Ti of the same. The third correcting circuit 13 receives as an input the blue primary color signal SB via an input terminal Ti of the same.

The first correcting circuit 11 performs gamma-correction on the red primary color signal SR and supplies the resultant corrected signal SR1 to the first amplifier circuit 21 via an output terminal To. The second correcting circuit 12 performs gamma-correction on the green primary color signal SG and supplies the resultant corrected signal SG1 to the second amplifier circuit 22 via an output terminal To. The third correcting circuit 13 performs gamma-correction on the blue primary color signal SB and supplies the resultant corrected signal SB1 to the third amplifier circuit 23 via an output terminal To.

The signal amplifier circuit 20 receives as inputs the corrected signals SR1, SG1, and SB1 and amplifies the same to generate amplified signals SR2, SG2, and SB2. The first amplifier circuit 21 receives as an input the corrected signal SR1, amplifies the same, and supplies the resultant amplified signal SR2 to the cathode 31 of the electron gun 34. The second amplifier circuit 22 receives as an input the corrected signal SG1, amplifies the same, and supplies the resultant amplified signal SG2 to the cathode 32 of the electron gun 34. The third amplifier circuit 23 receives as an input the corrected signal SB1, amplifies the same, and supplies the resultant amplified signal SB2 to the cathode 33 of the electron gun 34.

The electron gun 34 of the CRT 30 receives as inputs the amplified signals SR2, SG2, and SB2 to generate electron beams BR, BG, and BB. The electron gun 34 generates the electron beam BR according to the amplified signal SR2 and emits it to a fluorescent screen 35. The electron gun 34 generates the electron beam BG according to the amplified signal SG2 and emits it to the fluorescent screen 35. The electron gun 34 generates the electron beam BB according to the amplified signal SB2 and emits it to the fluorescent screen 35. The deflection circuit 40 receives as inputs the horizontal and vertical synchronizing signals SH and SV and generates a magnetic force by a deflecting coil (yoke) in accordance with the signals SH and SV to change the magnetic field force in the CRT 30 so that horizontal and vertical scanning by the electron beams from the electron gun 34 are carried out in the CRT 30.

As described above, the computer display apparatus 200 comprises a CRT 30 that includes the electron gun 30, the gamma correcting circuit 10 for gamma-correction of the three primary color signals SR, SG, and SB to respectively generate the corrected signals SR1, SG1, and SB1, and the signal amplifier circuit 20 receiving as inputs the corrected signals SR1, SG1, and SB1 from the gamma correcting circuit 10, amplifying them, and supplying the resultant amplifier signals SR2, SG2, and SB2, to the respective cathodes 31, 32, and 33 of the electron gun 34. The gamma correcting circuit 10 is made of a semiconductor device. The first to third correcting circuits 11 to 13 have the same structure.

Figure 3:
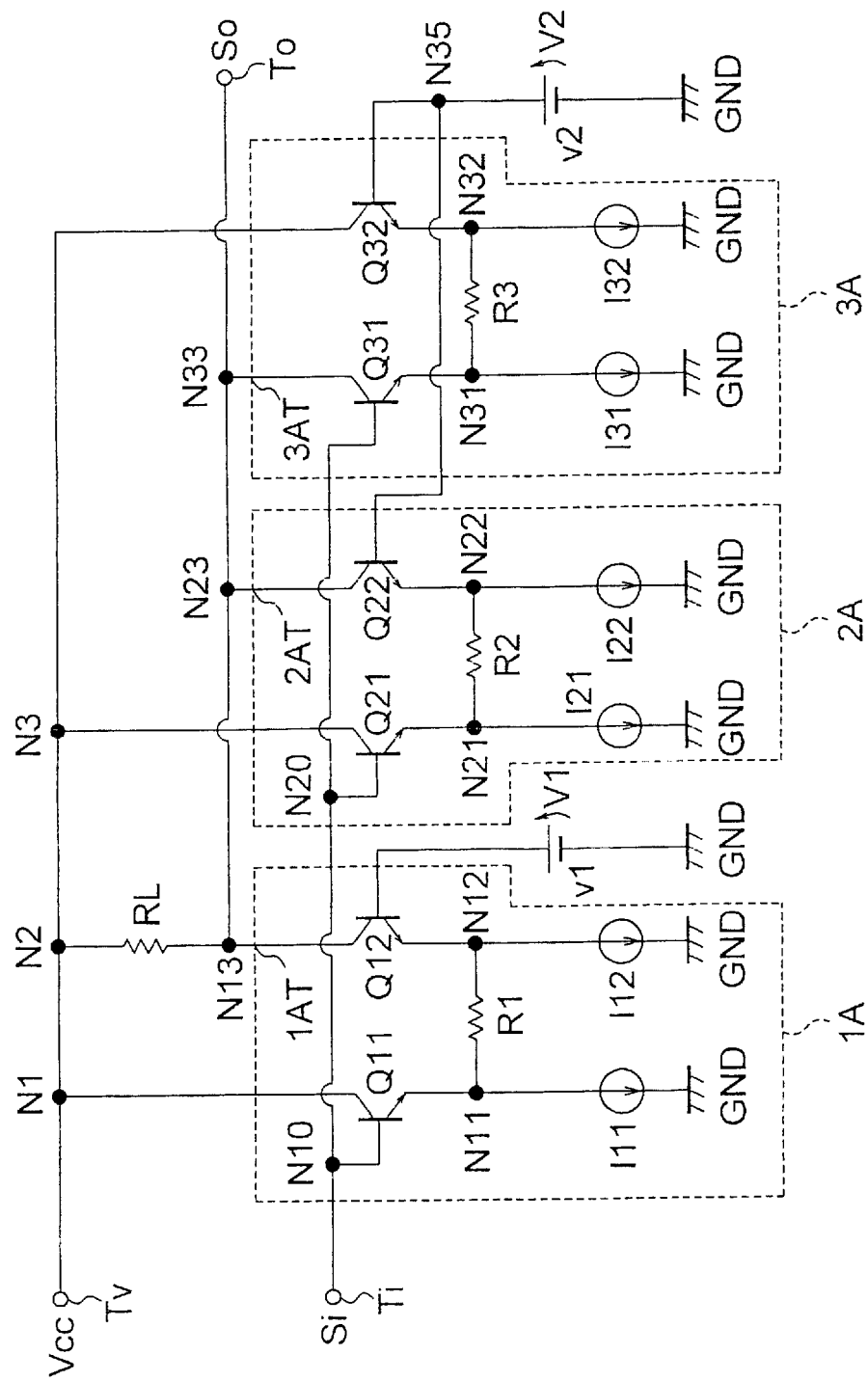
FIG. 3 is a circuit diagram of an example of a correcting circuit included in the illumination intensity correcting circuit of the present invention.

FIG. 3 is a circuit diagram of an example of a correcting circuit included in the gamma correcting circuit 10 of the computer display apparatus 200 of FIG. 2. This correcting circuit comprises parallel-connected differential amplifier circuits 1A, 2A, and 3A for generating signals corresponding to the difference between the voltages of the three primary color signals and reference voltages and a load resistor RL with one terminal connected to an input terminal of a source voltage Vcc and with another terminal connected to output terminals 1AT, 2AT, and 3AT of the differential amplifier circuits 1A, 2A, and 3A. The differential amplifier circuits 1A, 2A, and 3A and the load resistor RL form a curve fitting circuit whose amplification factor is changed before and after each breakpoint voltage. The reference voltages of the differential amplifier circuits 1A, 2A, and 3A are set so that the breakpoint voltage is arranged in the range of the voltage of the primary color signal. The amplification factors of the differential amplifier circuits 1A, 2A, and 3A are set so that the amplification factor of the curve fitting circuit in the range of the signal voltage lower than the breakpoint voltage becomes larger than the amplification factor of the curve fitting circuit in the range higher than the breakpoint voltage. The amplification factors of the differential amplifier circuits 1A, 2A, and 3A are adjustable by the electric resistance of the resistors R1, R2, and R3.

The first to third differential amplifier circuits 1A, 2A, and 3A include differential pair transistors whose emitters are respectively connected via resistors R1, R2, and R3, where bases of transistors Q11, Q21, and Q31 are connected to an input terminal Ti of the primary color signal Si, where bases of the other transistors Q12, Q22, and Q32 are respectively connected to the voltage sources v1, v2, and v2 for generating reference voltages V1, V2, and V2, and whose emitters are both grounded via a current source. The first differential amplifier circuit 1A includes differential pair transistors Q11 and Q12 whose emitters are mutually connected via the resistor R1, where the base of the transistor Q11 is connected to the input terminal Ti for the primary color signal Si, where the base of the other transistor Q12 is connected to the voltage source v1 for generating the reference voltage V1, and where emitters of the transistors Q11 and Q12 are respectively grounded via current sources I11 and I12. The second differential amplifier circuit 2A includes differential pair transistors Q21 and Q22 whose emitters are mutually connected via the resistor R2, where the base of the transistor Q21 is connected to the input terminal Ti for the primary color signal Si, where the base of the other transistor Q22 is connected to the voltage source v2 for generating the reference voltage V2, and where the emitters of the transistors Q21 and Q22 are respectively grounded via current sources I21 and I22. The third differential amplifier circuit 3A includes differential pair transistors Q31 and Q32 whose emitters are mutually connected via the resistor R3, where the base of the transistor Q31 is connected to the input terminal Ti for the primary color signal Si, where the base of the other transistor Q32 is connected to the voltage source v2 for generating the reference voltage V2, and where the emitters of the transistors Q31 and Q32 are respectively grounded via current sources I31 and I32.

The collectors of the transistors Q11 and Q21 of the differential pair transistors Q11, Q12, Q21, and Q22 in the first and second differential amplifier circuits 1A and 2A are connected to the input terminal Tv for the source voltage Vcc, the collectors of the other transistors Q12 and Q22 are connected to the other terminal of the load resistor RL, the collector of the other transistor Q32 of the differential pair transistors Q31 and Q32 in the third differential amplifier circuit 3A is connected to the input terminal Tv, and the collector of the transistor Q31 is connected to the other terminal of the load resistor RL.

In the first differential pair transistors Q11 and Q12, the first reference voltage V1 is set so that the three primary color signals are linearly amplified. In the first differential pair transistors Q11 and Q12 of the first correcting circuit 11, the first reference voltage V1 is set so that the red primary color signal SR is linearly amplified. In the first differential pair transistors Q11 and Q12 of the second correcting circuit 12, the first reference voltage V1 is set so that the green primary color signal SG is linearly amplified. In the first differential pair transistors Q11 and Q12 of the third correcting circuit 13, the first reference voltage V1 is set so that the blue primary color signal SB is linearly amplified.

In the correcting circuit of FIG. 3, a mark GND denotes a ground potential. The transistors Q11, Q12, Q21, Q22, Q31, and Q32 are npn transistors. The correcting circuit in FIG. 3 will be described in detail below. The source voltage Vcc is supplied to the nodes N1, N2, and N3. The input terminal Ti is connected to the nodes N10 and N20. The output terminal To is connected to the nodes N13, N23, and N33. The collector of the transistor Q11 is connected to the node N1, the base of the same is connected to the node N10, and the emitter of the same is connected to the node N11. The collector of the transistor Q12 is connected to the node N13 via an output terminal 1AT, the base of the same is connected to the constant-voltage source v1 for generating the reference voltage V1, and the emitter of the same is connected to the node N12. The nodes N13 and N2 are mutually connected via the loading resistor RL. The nodes N11 and N12 are mutually connected via the resistor R1, the node N11 is connected to the constant-current source I11, and the node N12 is connected to the constant-current source I12. The magnitudes of the driving currents of the constant-current sources I11 and I12 are equal.

The collector of the transistor Q21 is connected to the node N3, the base of the same is connected to the node N20, and the emitter of the same is connected to the node N21. The collector of the transistor Q22 is connected to the node N23 via an output terminal 2AT, the base of the same is connected to the node N35, and the emitter of the same is connected to the node N22. The node N35 is connected to the constant-voltage source v2 for generating the reference voltage V2. The nodes N21 and N22 are connected via the resistor R2 mutually. The node N21 is connected to the constant-current source I21, and the node N22 is connected to the constant-current source I22. The magnitudes of the driving currents of the constant-current sources I21 and I22 are equal.

The collector of the transistor Q31 is connected to the node N33 via an output terminal 3AT, the base of the same is connected to the node N20, and the emitter of the same is connected to the node N31. The collector of the transistor Q32 is connected to the node N3, the base of the same is connected to the node N35, and the emitter of the same is connected to the node N32. The nodes N31 and N32 are connected via the resistor R3 mutually. The node N31 is connected to the constant-current source I31, and the node N32 is connected to the constant-current source I32. The magnitudes of the driving currents of the constant-current sources I31 and I32 are equal.

If the correcting circuit in FIG. 3 is the first correcting circuit 11, the input terminal Ti is supplied with the red primary color signal SR as an input signal Si and the output terminal To is supplied with the corrected signal SR1. If the correcting circuit in FIG. 3 is the second correcting circuit 12, the input terminal Ti is supplied with the green primary color signal SG as an input signal Si and the output terminal To is supplied with the corrected signal SG1. If the correcting circuit in FIG. 3 is the third correcting circuit 13, the input terminal Ti is supplied with the blue primary color signal SB as an input signal Si and the output terminal To is supplied with the corrected signal SB1.

The first differential pair transistors Q11 and Q12, the constant-current sources I11 and I12, and the resistor R1 form the first differential amplifier circuit 1A. The input-output characteristic is described in FIG. 4. The second differential pair transistors Q21 and Q22, the constant-current sources I21 and I22, and the resistor R2 form the second differential amplifier circuit 2A. The input-output characteristic is described in FIG. 5. The third differential pair transistors Q31 and Q32, the constant-current sources I31 and I32, and the resistor R3 form the third differential amplifier circuit 3A. The input-output characteristic is described in FIG. 6.

Figure 4:
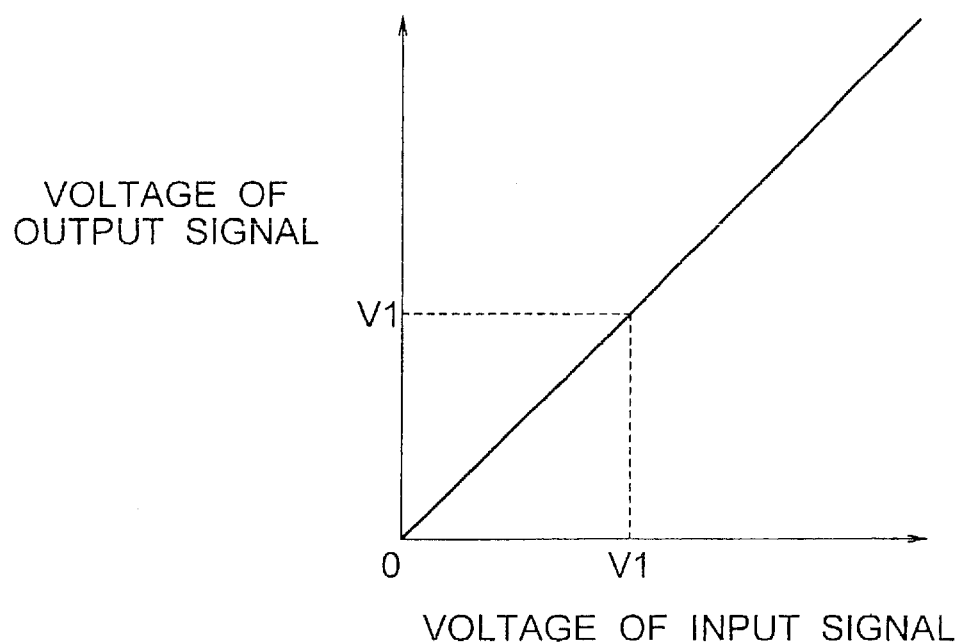
FIG. 4 is a graph of an input-output characteristic of a first differential amplifier circuit included in the correcting circuit of FIG. 3.
Figure 5:
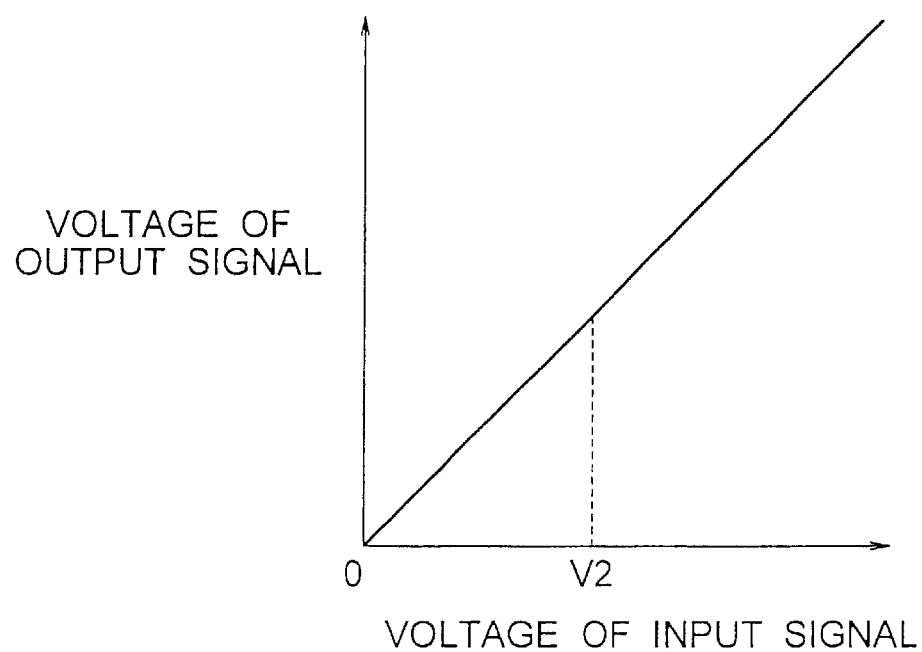
FIG. 5 is a graph of an input-output characteristic of a second differential amplifier circuit included in the correcting circuit of FIG. 3.

The graph of the input-output characteristic in FIG. 4 denotes a linear amplication characteristic. The first differential amplifier circuit 1A has the same amplification characteristic and a gain of for example 0 dB. The graph of the input-output characteristic in FIG. 5 denotes a linear amplication characteristic. The second differential amplifier circuit 2A has the same characteristic and a gain of for example 0 dB. In the first and second differential amplifier circuits 1A and 2A, the reference voltages V1 and V2 are respectively set so as to have linear amplification characteristics with respect to the three primary color signals.

Figure 6:
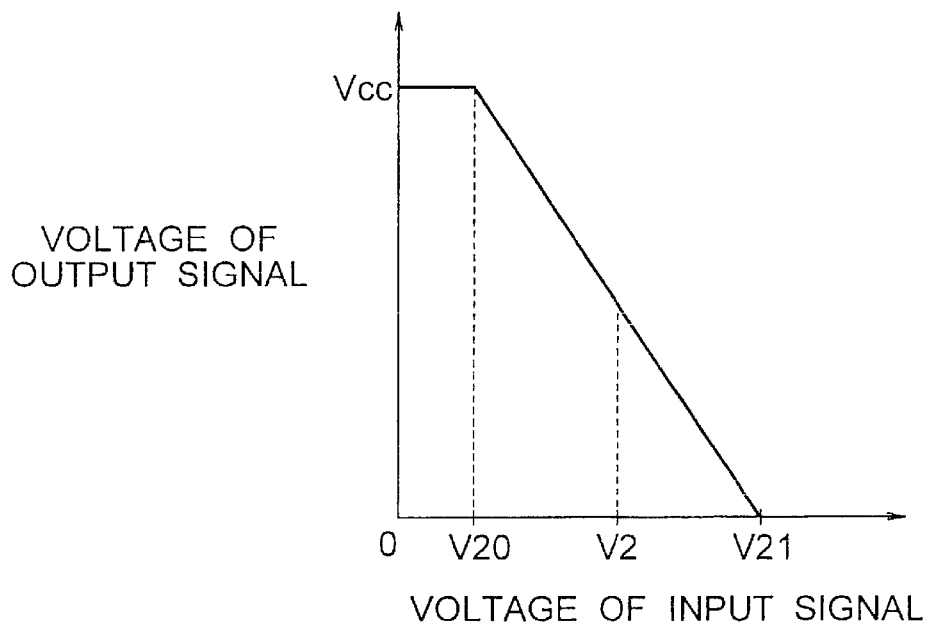
FIG. 6 is a graph of an input-output characteristic of a third differential amplifier circuit included in the correcting circuit of FIG. 3.

The graph of the input-output characteristic in FIG. 6 denotes a saturated amplification characteristic. The third differential amplifier circuit 3A has a broken line amplification characteristic. The range of the input signal voltage from 0 to V20 in FIG. 6 has an amplification characteristic in which the amplification factor is saturated, and. the range of the input signal voltage from V20 to V21 has an amplification characteristic in which the amplification factor is a minus gain. The input signal voltage range from V20 to V21 is included in the range of the input voltage that the second differential amplifier circuit 2A linearly amplifies. The absolute value of the gain in the input signal voltage range from V20 to V21 that the third differential amplifier circuit 3A linearly amplifies is larger than the absolute value of the gain of the second differential amplifier circuit 2A and is smaller than the sum of each gain of the first and second differential amplifier circuits 1A and 2A. The sum of each gain of the same is larger than 0 dB for example.

Figure 7:
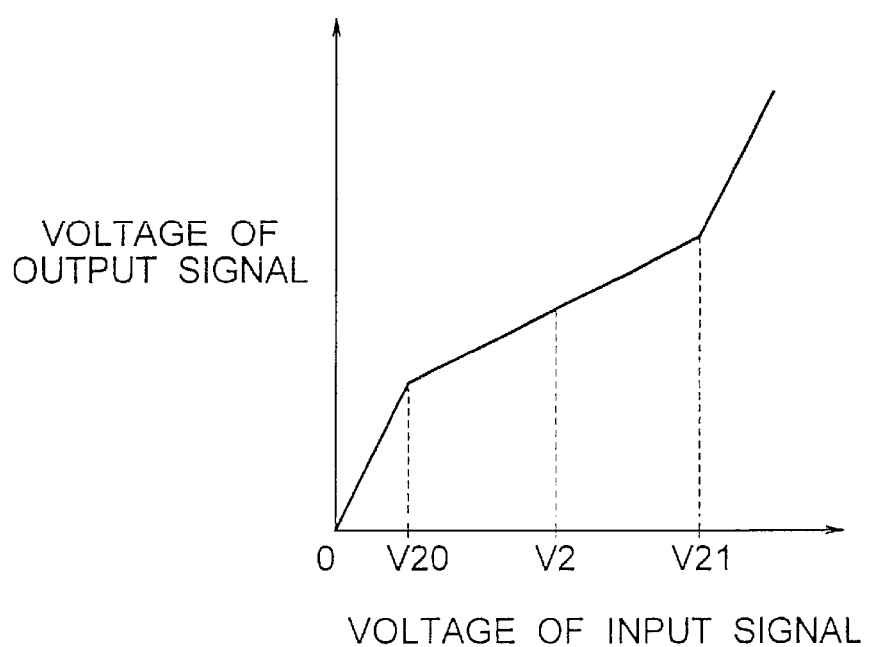
FIG. 7 is a graph of an input-output characteristic of the correcting circuit of FIG. 3.

FIG. 7 is a graph of an input-output characteristic of the correcting circuit of FIG. 3. The input-output characteristic in FIG. 7 combines the input-output characteristics in FIG. 4 to FIG. 6. In the graph of the input-output characteristic in FIG. 7, the range of the input signal voltage from 0 to V20 denotes a plus gain, the range of the input signal voltage from V20 to V21 denotes a minus gain, and the range of the input signal voltage larger than voltage V21 denotes a plus gain. The voltages V20 and V21 are breakpoint voltages of the characteristic curve in FIG. 7. If the voltage of the input signal (input voltage) is equal to the voltage V2, the voltage of the output signal (output voltage) is preferably the voltage V2. This reference voltage V2 is preferably equal to the maximum voltage of the three primary color signals.

Figure 8:
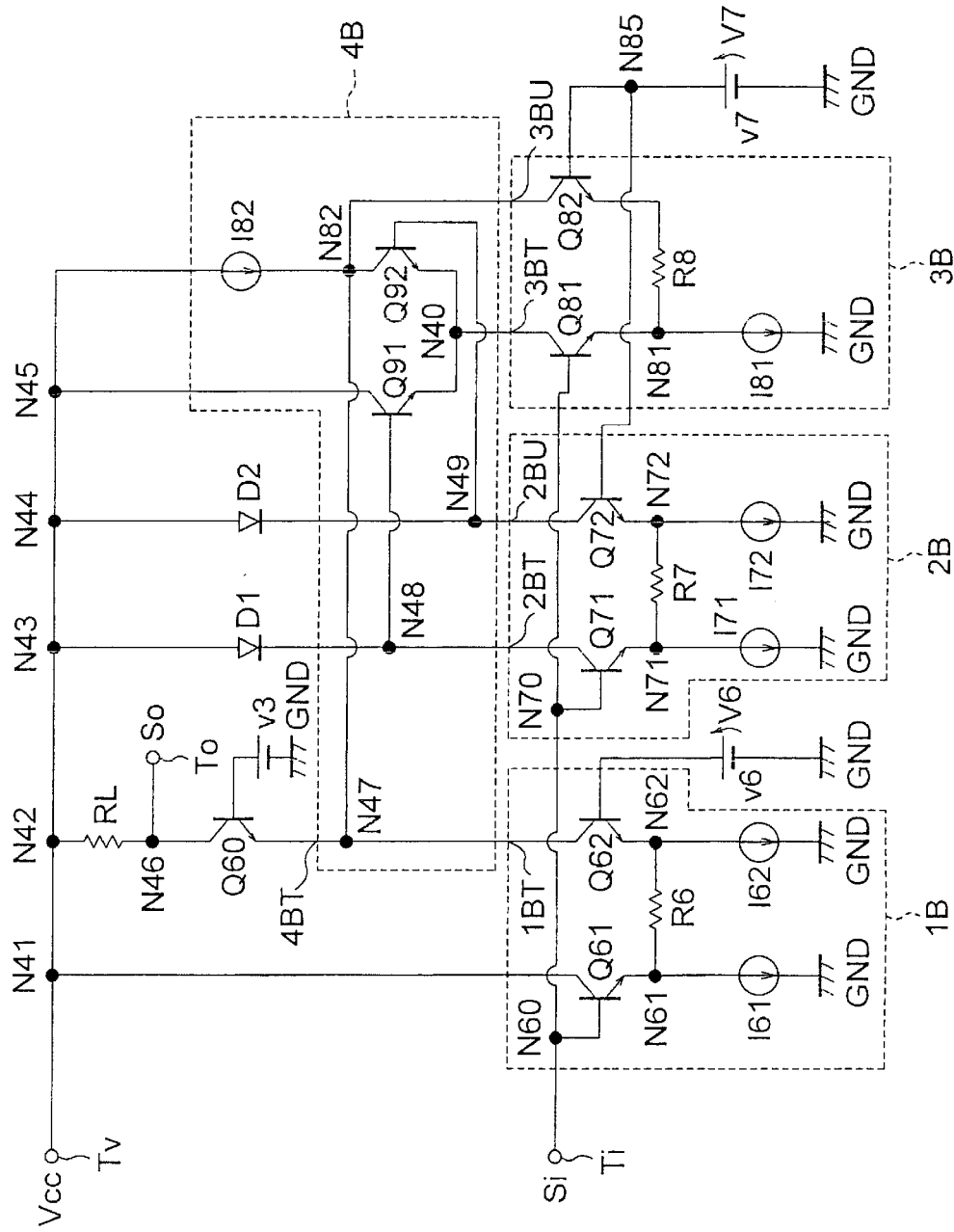
FIG. 8 is a circuit diagram of another example of a correcting circuit included in the illumination intensity correcting circuit of the present invention.

FIG. 8 is another example of a circuit diagram of the correcting circuit that is included in the gamma correcting circuit 10 of the computer display apparatus 200 in FIG. 2. This correcting circuit comprises differential amplifier circuits 1B, 2B, and 3B for generating signals corresponding to the difference between voltages of the three primary color signals and the respective reference voltages of the differential amplifier circuits 1B, 2B, and 3B, a synthesizing circuit 4B including a differential amplifier circuit to synthesize the output signals of the differential amplifier circuits 1B, 2B, and 3B, and a load resistor RL with one terminal connected to an input terminal for a source voltage Vcc and with another terminal connected to an output terminal 4BT of the synthesizing circuit 4B. The differential amplifier circuits 1B, 2B, and 3B, the synthesizing circuit 4B, and the load resistor RL form a curve fitting circuit whose amplification factor is changed before and after each breakpoint voltage. The reference voltages of the differential amplifier circuits 1B, 2B, and 3B are set respectively so that the breakpoint voltage is arranged in the range of the voltages of the three primary color signals. The amplification factors of the differential amplifier circuits 1B, 2B, and 3B are set respectively so that the amplification factor of the curve fitting circuit in the range of the signal voltage lower than the breakpoint voltage is larger than the amplification factor of the curve fitting circuit in the range higher than the breakpoint voltage. The amplification factors of the differential amplifier circuits 1B, 2B, and 3B can respectively be adjusted by the resistors R6, R7, and R8.

The synthesizing circuit 4B includes a differential amplifier circuit comprising differential pair transistors Q91 and Q92. The first, second, and third differential amplifier circuits 1B, 2B, and 3B comprise differential pair transistors whose emitters are respectively connected via the resistors R6, R7, and R8, where the bases of the transistors Q61, Q71, and Q81 are connected to an input terminal Ti for the primary color signal Si, and where the bases of the other transistors Q62, Q72, and Q82 are respectively connected to the voltage sources v6, v7, and v7 for respectively generating reference voltages V6, V7, and V7. The first differential amplifier circuit 1B comprises differential pair transistors Q61 and Q62 whose emitters are mutually connected via the resistor R6, where the base of the transistor Q61 is connected to the input terminal Ti for the primary color signal Si, and where the base of the other transistor Q62 is connected to the voltage source v6 for generating the reference voltage V6. The second differential amplifier circuit 2B comprises differential pair transistors Q71 and Q72 whose emitters are mutually connected via the resistor R7, where the base of the transistor Q71 is connected to the input terminal Ti for the primary color signal Si, and where the base of the other transistor Q72 is connected to the voltage source v7 for generating the reference voltage V7. The third differential amplifier circuit 3B comprises differential pair transistors Q81 and Q82 whose emitters are mutually connected via the resistor R8, where the base of the transistor Q81 is connected to the input terminal Ti for the primary color signal Si, and where the base of the other transistor Q82 is connected to the voltage source v7 for generating the reference voltage V7.

The emitters of the differential pair transistors of the first and second differential amplifier circuits 1B and 2B are grounded via a current source. The emitters of the differential pair transistors Q61 and Q62 of the first differential amplifier circuit 1B are respectively grounded via current sources I61 and I62. The emitters of the differential pair transistors Q71 and Q72 of the second differential amplifier circuit 2B are respectively grounded via current sources I71 and I72. The emitter of the transistor Q81 of the differential pair transistors Q81 and Q82 in the third differential amplifier circuit 3B is grounded via a current source I81.

The base of the transistor Q91 of the differential pair transistors Q91 and Q92 in the synthesizing circuit 4B is connected to the collector of the transistor Q71 of the differential pair transistors Q71 and Q72 in the second differential amplifier circuit 2B. The base of the other transistor Q92 of the differential pair transistors Q91 and Q92 in the synthesizing circuit 4B is connected to the collector of the other transistor Q72 of the differential pair transistors Q71 and Q72 in the second differential amplifier circuit 2B. The node N40 connected to the emitters of the differential pair transistors Q91 and Q92 of the synthesizing circuit 4B is connected to the collector of the transistor Q81 of the differential pair transistors Q81 and Q82 in the third differential amplifier circuit 3B. The collector of the other transistor Q92 of the differential pair transistors Q91 and Q92 in the synthesizing circuit 4B is connected to the collectors of the other transistors Q62 and Q82 of the differential pair transistors in the first and third differential amplifier circuits 1B and 3B.

The collectors of the transistors Q91 and Q61 of the differential pair transistors in the synthesizing circuit 4B and the first differential amplifier circuit 1B and the collectors of the differential pair transistors Q71 and Q72 in the second differential amplifier circuit 2B are connected to the input terminal Tv for the source voltage Vcc. The collector of the other transistor Q92 of the differential pair transistors Q91 and Q92 in the synthesizing circuit 4B and the input terminal Tv for the source voltage Vcc are connected via a current source I82. The magnitude of the driving current of the current source I82 is equal to that of the current source I81 which is connected to the emitter of the transistor Q81 of the differential pair transistors Q81 and Q82 in the third differential amplifier circuit 3B.

In the differential pair transistors Q61 and Q62 of the first differential amplifier circuit 1B, the reference voltage V6 is set so that the three primary color signals are linearly amplified. In the differential pair transistors Q61 and Q62 of the first correcting circuit 11, the reference voltage V6 is set so that the red primary color signal SR is linearly amplified. In the differential pair transistors Q61 and Q62 of the second correcting circuit 12, the reference voltage V6 is set so that the green primary color signal SG is linearly amplified. In the differential pair transistors Q61 and Q62 of the third correcting circuit 13, the reference voltage V6 is set so that the blue primary color signal SB is linearly amplified.

In the correcting circuit in FIG. 8, a mark GND denotes a ground potential. The transistors Q60, Q61, Q62, Q71, Q72, Q81, Q82, Q91, and Q92 are npn transistors. The correcting circuit in FIG. 8 is described in detail below. The source voltage Vcc is supplied to the nodes N41, N42, N43, N44, and N45. The input terminal Ti is connected to the nodes N60 and N70. The output terminal To is connected to the node N46. The collector of the transistor Q61 is connected to the node N41, the base is connected to the node N60, and the emitter is connected to the node N61. The collector of the transistor Q62 is connected to the node N47 via an output terminal 1BT, the base is connected to the constant-voltage source v6 for generating the reference voltage V6, and the emitter is connected to the node N62. The nodes N47 and N46 are,connected via an output transistor Q60, and the nodes N46 and N42 are connected via a load resistor RL. The base of the output transistor Q60 is connected to the constant-voltage source v3 for generating a DC bias voltage V3. The nodes N61 and N62 are mutually connected via the resistor R6, the node N61 is connected to a constant-current source I61, and the node N62 is connected to a constant-current source I62. The magnitudes of the driving currents of the constant-current sources I61 and I62 are equal. One terminal of the load resistor RL is connected to the node N42 and the other terminal is connected to the output terminal 4BT of the synthesizing circuit 4B via the output transistor Q60. The node N47 is connected to the output terminal 4BT of the synthesizing circuit 4B. The voltage of the output signal So can be arranged between the,DC bias voltage V3 and the source voltage Vcc, so that the DC bias voltage V3 is included in the output signal So.

The collector of the transistor Q71 is connected to the node N48 via an output terminal 2BT, the base is connected to the node N70, and the emitter is connected to the node N71. The collector of the transistor Q72 is connected to the node N49 via an output terminal 2BU, the base is connected to the node N85, and the emitter is connected to the node N72. The node N85 is connected to the constant-voltage source v7 for generating the reference voltage V7. The nodes N71 and N72 are mutually connected via the resistor R7. The node N71 is connected to the constant-current source I71, and the node N72 is connected to the constant-current source I72. The magnitudes of the driving currents of the constant-current sources I71 and I72 are equal.

The node N43 is connected to the anode of a diode D1, and the node N48 is connected to the cathode of the diode D1. The node N44 is connected to the anode of a diode D2, and the node N49 is connected to the cathode of the diode D2. The collectors of the differential pair transistors Q71 and Q72 of the second differential amplifier circuit 2B is respectively connected to the input terminal Tv for the source voltage Vcc via the diodes D1 and D2, and the diodes D1 and D2 are respectively connected between the collectors of the transistors Q71 and Q72 and the input terminal Tv so as to be supplied with forward voltages.

The collector of the transistor Q81 is connected to the node N40 via an output terminal 3BT, the base is connected to the node N70, and the emitter is connected to the node N81. The collector of the transistor Q82 is connected to the node N82 via an output terminal 3BU, the base is connected to the node N85, and the emitter is connected to the node N81 via the resistor R8. The node N81 is connected to the constant-current source I81, and the nodes N45 and N82 are connected via the constant-current source I82. The magnitudes of the driving currents of the constant-current sources I81 and I82 are equal.

The collector of the transistor Q91 is connected to the node N45, the base is connected to the node N48, and the emitter is connected to the node N40. The collector of the transistor Q92 is connected to the node N82, the base is connected to the node N49, and the emitter is connected to the node N40 where the emitters of the transistors Q91 and Q92 are connected. The synthesizing circuit 4B comprising the differential pair transistors Q91 and Q92 and the constant-current source I82 synthesizes the signals which are generated by the first to third differential amplifier circuits 1B to 3B, and the resultant synthesized signal is supplied to the output terminal 4BT of the synthesizing circuit 4B.

If the correcting circuit in FIG. 8 is the first correcting circuit 11, the input terminal Ti is supplied with the red primary color signal SR as an input signal Si and the output terminal To is supplied with the corrected signal SR1. If the correcting circuit in FIG. 8 is the second correcting circuit 12, the input terminal Ti is supplied with the green primary color signal SG as an input signal Si and the output terminal To is supplied with the corrected signal SG1. If the correcting circuit in FIG. 8 is the third correcting circuit 13, the input terminal Ti is supplied with the blue primary color signal SB as an input signal Si and the output terminal To is supplied with the corrected signal SB1.

Figure 9:
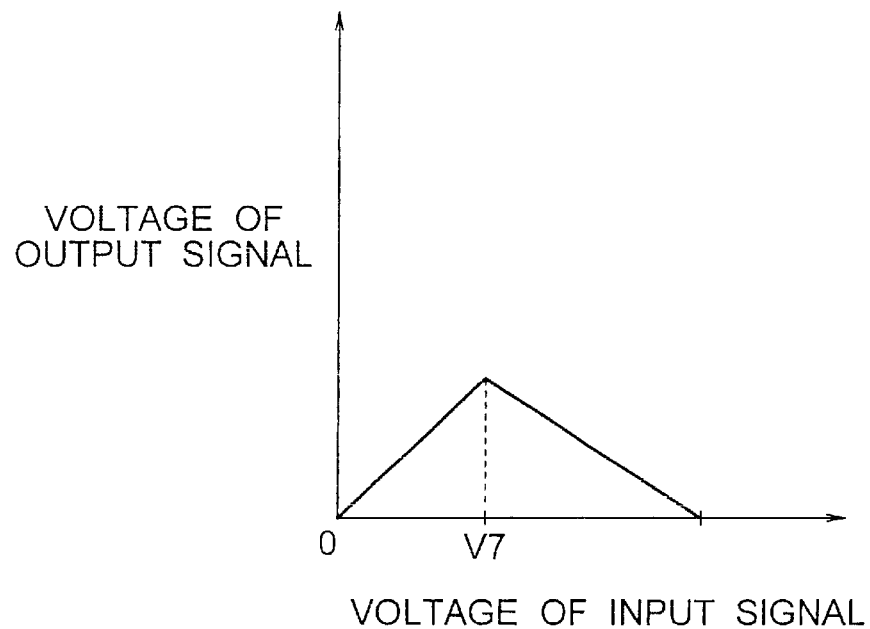
FIG. 9 is a graph of an input-output characteristic of an amplifier circuit formed by the second differential amplifier circuit, the third differential amplifier circuit, and the synthesizing circuit of FIG. 8.

The differential pair transistors Q61 and Q62, the constant-current sources I61 and I62, and the resistor R6 form the first differential amplifier circuit 1B. The first differential amplifier circuit 1B has a linear amplification characteristic for the primary color signal Si. The differential pair transistors Q71 and Q72, the constant-current sources I71 and I72, and the resistor R7 form the second differential amplifier circuit 2B. The differential pair transistors Q81 and Q82, the constant-current source I81, and the resistor R8 form the third differential amplifier circuit 3B. The input-output characteristic of an amplifier circuit comprising the second and third differential amplifier circuits 2B and 3B and the synthesizing circuit 4B is described in FIG. 9.

In the amplifier circuit comprising the second and third differential amplifier circuits 2B and 3B and the synthesizing circuit 4B, if the voltage of the primary color signal, that is, the input signal Si, is larger than the reference voltage V7, the transistor Q71 of the differential pair transistors Q71 and Q72 is turned ON or nearly ON, and the other transistor Q72 is turned OFF or nearly OFF. Furthermore, the transistor Q91 of the differential pair transistors Q91 and Q92 is turned OFF or nearly OFF, and the other transistor Q92 is turned ON or nearly ON. Furthermore, the transistor Q81 of the differential pair transistors Q81 and Q82 is turned ON or nearly ON, and the other transistor Q82 is turned OFF or nearly OFF. The increase of the collector current of the transistor Q92 causes the collector current of the transistor Q60 to increase and the signal voltage of the output signal So at the output terminal To to decrease.

If the voltage of the primary color signal, that is, the input signal Si, is smaller than the reference voltage V7, the transistor Q71 of the differential pair transistors Q71 and Q72 is turned OFF or nearly OFF and the other transistor Q72 is turned ON or nearly ON. Furthermore, the transistor Q91 of the differential pair transistors Q91 and Q92 is turned ON or nearly ON, and the other transistor Q92 is turned OFF or nearly OFF. Furthermore, the transistor Q81 of the differential pair transistors Q81 and Q82, is turned OFF or nearly OFF, and the other transistor Q82 is turned ON or nearly ON. The decrease of the collector current of the transistor Q92 causes the collector current of the transistor Q60 to decrease and the signal voltage of the output signal So at the output terminal To to increase. As a result, an input-output characteristic of a curve fitting amplification that has a peakpoint at the reference voltage V7 is obtained from the second and third differential amplifier circuits 2B and 3B and the synthesizing circuit 4B.

Figure 10:
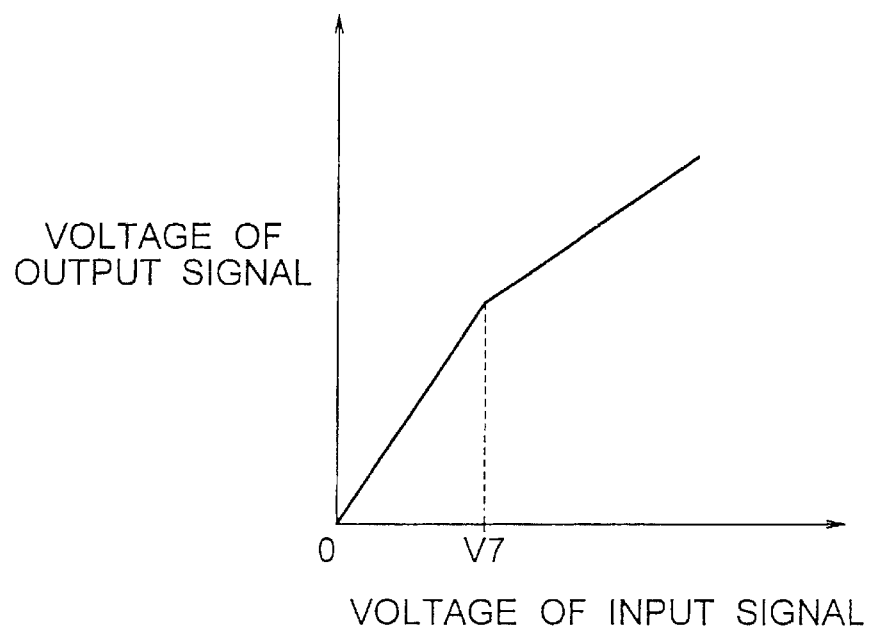
FIG. 10 is a graph of an input-output characteristic of the correcting circuit of FIG. 8.

Meanwhile, the first differential amplifier circuit 1B has the characteristic of linear amplification for the primary color signal, that is, the input signal Si, so the input-output characteristic of the correcting circuit in FIG. 8 is drawn like that in FIG. 10, which is a curve fitting characteristic that has a breakpoint voltage at the reference voltage V7. In the correcting circuit of FIG. 8, if the signal voltage of the input signal Si is maximum in the range of the input signal Si, the maximum signal voltage may be supplied to the output terminal To.

In FIG. 10, the range of the voltage of the input signal from 0 to V7 has a characteristic of a plus gain (dB) for example, and the range of the voltage of the input signal larger than the voltage V7 has a characteristic of a minus gain (dB) for example. The convex curve of the input-output characteristic is obtained so as to give a breakpoint voltage at the reference voltage V7.

By comprising the illumination intensity correcting circuit including the first to third correcting circuits by differential amplifier circuits of bipolar transistors, the illumination intensity correcting circuit can be made to operate at a high speed. In a computer display apparatus, the primary color signals supplied to the CRT sometimes include about 100 MHz frequency components or higher than that of a television receiver, however the differential amplifier circuit makes gamma-correction of such primary color signals possible and gives a frequency range enough for gamma-correction. Since the illumination intensity correcting circuit is made of a semiconductor device, it is possible to make the cut-off frequency about 150 MHz for example.

By increasing the number of the differential pair transistors of the illumination intensity correcting circuit, it is possible to obtain an input-output characteristic of a fitting curve including plurality of breakpoints. By changing the reference voltage, the arrangement of the breakpoint can be changed to increase the luminance or intensity of the input primary color signals. Further, by changing the gain, the display luminance can be changed.

It is possible for the illumination intensity correcting circuit of the above embodiments to increase the intermediate luminance near the reference voltages V2 and V7 without increasing the maximum value of the signal voltage of the primary color signals that are supplied to an electron gun in the CRT and possible to increase the luminosity in a screen of the CRT, so the computer display apparatus is upgraded. The illumination intensity correcting circuit preferably comprises a gm amplifier that changes the output current corresponding to the difference between the input voltage and the reference voltage.

The above embodiments were described with reference to the case of gamma-correction of three primary color signals, however in the particular case of a television receiver which shows an image based on the luminance, i.e., a black-and-white television, the illumination intensity correcting circuit may perform gamma-correction on a video signal comprised of a luminance signal. In this case, the illumination intensity correcting circuit can comprise the circuit described in FIG. 3 or FIG. 8.

The Illumination intensity correcting circuit can also be comprised of the circuit In FIG. 8 with the output transistor Q60 and the constant-voltage source v3 removed and the node N46 connected to the output terminal 4BT.

As described above, according to the present embodiments, the illumination intensity correcting circuit can operate at a high speed and perform gamma-correction on the high frequency component of an input video signal or input three primary color signals, so that the resolution and luminosity of a screen of a display apparatus can be upgraded. Furthermore, it is possible to prevent the input-output characteristic of the fitting curve of the illumination intensity correcting circuit from distorting near each breakpoint. A computer display apparatus sometimes includes more high frequency components in the video signal or three primary color signals in comparison with a television receiver, so the illumination intensity correcting circuit can provide a gamma correcting circuit able to be used for a computer display apparatus.

Note that the present invention is not limited to the above embodiments and includes modifications within the scope of the claims.

While the invention has been described with reference to specific embodiment chosen for purpose of illustration, it should be apparent that numerous modifications could be made thereto by those skilled in the art without departing from the basic concept and scope of the invention.

What is claimed is:

1. An illumination intensity correcting circuit for performing gamma-correction on a video signal comprising:

parallel-connected differential amplifier circuits for generating signals corresponding to the difference between a voltage of the video signal and the reference voltages of the differential amplifier circuits and a load resistor with one terminal connected to an input terminal of a source voltage and with another terminal connected to the output terminals of the differential amplifier circuits, wherein a curve fitting circuit whose amplification factor is changed before and after each breakpoint voltage is formed by the differential amplifier circuits and the load resistor, the reference voltages of the differential amplifier circuits are set so that at least two breakpoint voltages are arranged in the range of the voltage of the video signal, and the amplification factors of the differential amplifier circuits are set so that the amplification factor of the curve fitting circuit in the range of the signal voltage between the two breakpoint voltages is smaller than the amplification factor of the curve fitting circuit outside the range between the two breakpoint voltages, wherein:

the parallel-connected differential amplifier circuits include first to third differential amplifier circuits comprising differential pair transistors, in each pair of which emitters are connected via a resistor and are grounded via current sources, a base of one transistor is connected to an input terminal for the video signal, a base of the other transistor is connected to a voltage source for generating a reference voltage, a collector of one transistor of the first and second differential amplifier circuits is connected to an input terminal for the source voltage, and a collector of the other transistor is connected to the other terminal of the load resistor, a collector of the other transistor of the third differential amplifier circuit is connected to the input terminal for the source voltage, and a collector of the one transistor of the third differential amplifier circuit is connected to the other terminal of the load resistor.

2. An illumination intensity correcting circuit for performing gamma-correction on three primary color signals comprising:

first, second, and third correcting circuits respectively receiving as inputs red, green, and blue primary color signals and comprising:
  parallel-connected differential amplifier circuits for respectively generating signals corresponding to the difference between voltages of the three primary color signals and the reference voltages of the differential amplifier circuits and
  a load resistor with one terminal connected to an input terminal of a source voltage and with another terminal connected to the output terminals of the differential amplifier circuits, wherein
  a curve fitting circuit whose amplification factor is changed before and after each breakpoint voltage is formed by the differential amplifier circuits and the load resistor,
  the reference voltages of the differential amplifier circuits are set so that at least two breakpoint voltages are arranged in the range of the voltages of the three primary color signals, and
  the amplification factors of the differential amplifier circuits are set so that the amplification factor of the curve fitting circuit in the range of the signal voltage between the two breakpoint voltages is smaller than the amplification factor of the curve fitting circuit outside of the range of the two breakpoint voltages
  wherein the parallel-connected differential amplifier circuits include first to third differential amplifier circuits comprising differential pair transistors, in each pair of which:
    emitters are connected via a resistor and grounded via current sources respectively,
    a base of one transistor is connected to an input terminal for the primary color signal, and
    a base of the other transistor is connected to a voltage source for generating a reference voltage,
    collectors of the one transistors of the first and second differential amplifier circuits are connected to an input terminal for the source voltage,
    collectors of the other transistors are connected to the other terminal of the load resistor,
    a collector of the other transistor of the third differential amplifier circuit is connected to the input terminal for the source voltage, and
    a collector of the one transistor of the third differential amplifier circuit is connected to the other terminal of the load resistor.

3. An illumination intensity correcting circuit comprising:
  a plurality of differential amplifier circuits, said plurality of differential amplifier circuits having a first differential amplifier circuit, a second differential amplifier circuit, and a third differential amplifier circuit;
  an input signal, said an input signal being applied to said first, second and third differential amplifier circuits;
  a first reference voltage, said first reference voltage being applied to said first differential amplifier circuit; and
  a second reference voltage, said second reference voltage being applied to said second and third differential amplifier circuits, wherein:
    said first, second and third differential amplifier circuits, each, include differential pair transistors,
    one transistor of said differential pair transistors having a base connected to an input terminal for said input signal,
    another transistor of said differential pair transistors having a base connected to a voltage source, said voltage source generating one of said first and second reference voltages,
    an emitter of said one transistor being connected to ground via a current source and connected to one terminal of circuit resistor,
    an emitter of said another transistor being connected to ground via a current source, and being connected and connected to another terminal of said circuit resistor.

4. An illumination intensity correcting circuit as set forth in claim 3, wherein said illumination intensity correcting circuit performs gamma correction on said input signal.

5. An illumination intensity correcting circuit as set forth in claim 3, further comprising:
  a synthesizing circuit, said synthesizing circuit being connected to said first, second and third differential amplifier circuits.

6. An illumination intensity correcting circuit as set forth in claim 5, wherein said synthesizing circuit further comprises:
  a fourth differential amplifier circuit.

7. An illumination intensity correcting circuit as set forth in claim 15, wherein said illumination intensity correcting circuit outputs an amplified input signal, said amplified input signal having a first breakpoint voltage, said amplified input signal having a lesser amplification after said first breakpoint voltage than before said first breakpoint voltage.

8. An illumination intensity correcting circuit as set forth in claim 3, wherein said illumination intensity correcting circuit outputs an amplified input signal, said amplified input signal having a first breakpoint voltage and a second breakpoint voltage, said amplified input signal having a lesser amplification after said first breakpoint voltage than before said first breakpoint voltage.

9. An illumination intensity correcting circuit as set forth in claim 8, wherein said amplified input signal has a greater amplification after said second breakpoint voltage than before said second breakpoint voltage.

10. An illumination intensity correcting circuit as set forth in claim 3, wherein said first, second and third differential amplifier circuits are connected in parallel.

11. An illumination intensity correcting circuit as set forth in claim 3, wherein said first reference voltage is set to a voltage such that said first differential amplifier circuit linearly amplifies said video signal.

12. An illumination intensity correcting circuit as set forth in claim 3, wherein said second reference voltage is set to a voltage such that said second differential amplifier circuit linearly amplifies said video signal.

13. An illumination intensity correcting circuit as set forth in claim 3, wherein said input signal is a video signal.

14. An illumination intensity correcting circuit as set forth in claim 3, wherein said input signal is a primary color signal.

15. An illumination intensity correcting circuit as set forth in claim 14, wherein said primary color signal is one of a red primary color signal, a green primary color signal, and a blue primary color signal.

16. An illumination intensity correcting circuit as set forth in claim 14, wherein said second reference voltage is equal to the maximum voltage of said primary color signal.

17. An illumination intensity correcting circuit as set forth in claim 14, wherein said first, second and third differential amplifier circuits and a load resistor comprise a curve fitting circuit whose amplification factor is changed before and after each breakpoint voltage is formed,
  said first and second reference voltages being set so that at least two breakpoint voltages are arranged in the voltage range of said primary color signal.

18. An illumination intensity correcting circuit as set forth in claim 3, wherein said first and second reference voltages are set so that at least two breakpoint voltages are arranged in the range of the voltage of said input signal.

19. An illumination intensity correcting circuit as set forth in claim 3, wherein:

said first differential amplifier circuit has a first amplifier signal input terminal and a first amplifier reference input terminal, said input signal being applied to said first amplifier signal input terminal and said first reference voltage being applied to said first amplifier reference input terminal, said first amplifier signal input terminal being different from said first amplifier reference input terminal, said second differential amplifier circuit has a second amplifier signal input terminal and a second amplifier reference input terminal, said input signal being applied to said second amplifier signal input terminal and said second reference voltage being applied to said second amplifier reference input terminal, said second amplifier signal input terminal being different from said second amplifier reference input terminal, said third differential amplifier circuit has a third amplifier signal input terminal and a third amplifier reference input terminal, said input signal being applied to said third amplifier signal input terminal and said third reference voltage being applied to said second amplifier reference input terminal, said third amplifier signal input terminal being different from said third amplifier reference input terminal.

* * * * *